United States Patent [19]
Ryan

[11] Patent Number: 6,075,514
[45] Date of Patent: *Jun. 13, 2000

[54] COLOR TABLE LOOK-UP HAVING LAST VALUE MEMORY

[75] Inventor: Dennis L. Ryan, Santa Ana, Calif.

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/019,191

[22] Filed: Feb. 5, 1998

[51] Int. Cl.$^7$ ........................................ G09G 5/04
[52] U.S. Cl. ........................... 345/153; 345/199; 382/167
[58] Field of Search .................................... 345/150, 153, 345/154, 155, 199; 382/167, 162, 163, 166; 358/518, 520; 347/43; 395/109

[56] References Cited

U.S. PATENT DOCUMENTS

| | | | |
|---|---|---|---|
| 5,140,312 | 8/1992 | Ishii ........................................ | 345/153 |
| 5,479,186 | 12/1995 | McManus et al. ....................... | 345/153 |
| 5,488,398 | 1/1996 | Matsubara et al. ....................... | 347/43 |
| 5,500,661 | 3/1996 | Matsubara et al. ....................... | 347/41 |
| 5,510,851 | 4/1996 | Foley et al. ............................... | 345/199 |
| 5,633,663 | 5/1997 | Matsubara et al. ....................... | 347/41 |
| 5,847,700 | 12/1998 | Hannah ................................... | 345/199 |

*Primary Examiner*—Xiao Wu
*Attorney, Agent, or Firm*—Fitzpatrick, Cella, Harper & Scinto

[57] ABSTRACT

A system for correcting pixel color values, with each color value represented by a byte of data, includes applying look-up table correction to first, second, third, and fourth bytes of input color value data to obtain corresponding first, second, third, and fourth bytes of corrected output data, simultaneously comparing the first byte of input color value data to a fifth byte of input color value data, the second byte of input color value data to a sixth byte of input color value data, the third byte of input color value data to a seventh byte of input color value data, and the fourth byte of input color value data to an eighth byte of input color value data. The first, second, third, and fourth bytes of corrected output data are stored as outputs corresponding to the fifth, sixth, seventh, and eighth bytes of input color value data if all comparisons in the comparing step indicate equality, and look-up table correction is applied to obtain corrected output data corresponding to the fifth, sixth, seventh, and eighth bytes of input color value data if any of the comparisons in the comparing step indicate inequality.

18 Claims, 6 Drawing Sheets

COLOR TABLE LOOK-UP HAVING LAST VALUE MEMORY

BACKGROUND OF THE INVENTION

1. Field of the Invention

The present invention concerns a fast method for utilizing look-up tables to obtain corrected color values from input color values.

2. Description of the Related Art

Current digital color printing systems are capable of printing pixels representing color image data onto a recording medium. Prior to printing pixels, however, it is generally desirable to perform corrections on the color image data in order to compensate for print head characteristics, or to adapt the data to a desired printing mode. Such corrections can be performed using on-the-fly calculations or using pre-calculated look-up tables. However, corrected values are often experimentally derived as well as non-linear. Accordingly, on-the-fly calculations in such cases are computationally-intensive and therefore require significant resources and time.

Therefore, look-up tables are often used to perform color correction. Specifically, four separate look-up tables are used, one for each of cyan, magenta, yellow and black components of the image data, with each look-up table containing corrected color values corresponding to each potential input color value. In many applications, multiple sets of cyan, magenta, yellow, and black look-up tables are stored, and the appropriate set of look-up tables is selected based on detected conditions. Once a set of look-up tables has been selected, color correction for a given pixel merely requires using each of the input color values as an index to a corresponding look-up table, from which a corresponding corrected color value is obtained. For example, an input cyan value would be used to address a selected cyan look-up table, from which a corrected cyan value corresponding to the input cyan value is obtained.

As described above, color correction using look-up tables often proceeds faster than mathematical calculation of corrected values in real time. However, such look-up table processing requires a look-up function to be performed for each color component of each pixel in input image data. Moreover, as related processing becomes increasingly faster, memory look-ups are more frequently becoming a limiting factor to system performance. For instance, when performing a look-up using the Pentium processor, there is, among other delays, a processor pause for one instruction (e.g. an address grid interlock) period between loading a value into a register and looking up the value.

Accordingly, what is needed is a faster method for obtaining corrected color values from input color values.

SUMMARY OF THE INVENTION

It is therefore an object of the present invention to provide a faster color correction technique. In order to address this object, the present invention re-uses output-corrected color values, and thereby avoids re-determination of corrected values in many cases. Specifically, when color values of a next set of adjacent pixels are identical to corresponding values of a previous set of adjacent pixels, output-corrected values corresponding to the previous set of adjacent pixels are re-used for the next set of adjacent pixels.

Thus, according to one aspect of the invention, a technique is provided for applying a look-up table to correct pixel values, with each pixel represented by a byte of color data. First, look-up table correction is applied to first, second, third, and fourth bytes of input color value data to obtain corresponding first, second, third, and fourth bytes of corrected output data. Next, the first, second, third, and fourth bytes of input color value data are simultaneously compared to fifth, sixth, seventh, and eighth bytes of input color value data, respectively. If all comparisons in the comparison step indicate equality, the first, second, third, and fourth bytes of corrected output data are stored as outputs corresponding to the fifth, sixth, seventh, and eighth bytes of input color value data. On the other hand, if the comparison indicates inequality, look-up table correction is applied to obtain corrected output data corresponding to the fifth, sixth, seventh, and eighth bytes of input color value data. Preferably, the first, second, third and fourth bytes of input data are dword-aligned, and the fifth, sixth, seventh and eighth bytes of input data are dword-aligned, so that loading of the two sets of four bytes into CPU registers and subsequent 32-bit comparison can be performed without unnecessary delays.

By virtue of the foregoing arrangement, output correction can be performed faster than conventional output correction. For instance, in representative embodiments of the invention, four bytes of data, corresponding to color values of four horizontally-adjacent pixels in a single color plane, are compared to corresponding values of a previous four horizontally-adjacent pixels. If the values are identical, then no look-up operations need to be performed for the current group of four pixels. Instead, output values corresponding to the previous four pixels are re-used. Moreover, because four-pixel patterns in a single color frequently repeat for many different types of graphics images, the present invention often significantly reduces average processing time required to correct multi-level color image data.

For instance, many documents contain large areas of white space. These areas contain long strings of identically-valued pixels (i.e., zero). Accordingly, because the present invention obtains corrected values from a look-up table only once for each of these strings, the present invention can significantly reduce the time required to obtain corrected pixel values for such documents. In fact, use of the present invention to correct pixel values of these documents can proceed faster than conventional correction systems, which, for each pixel, determine whether the pixel has a zero value and, if so, do not perform correction on the pixel.

This brief summary has been provided so that the nature of the invention may be understood quickly. A more complete understanding of the invention can be obtained by reference to the following detailed description of the preferred embodiments thereof in connection with the attached drawings.

DETAILED DESCRIPTION OF THE PREFERRED EMBODIMENTS

Figure 1:
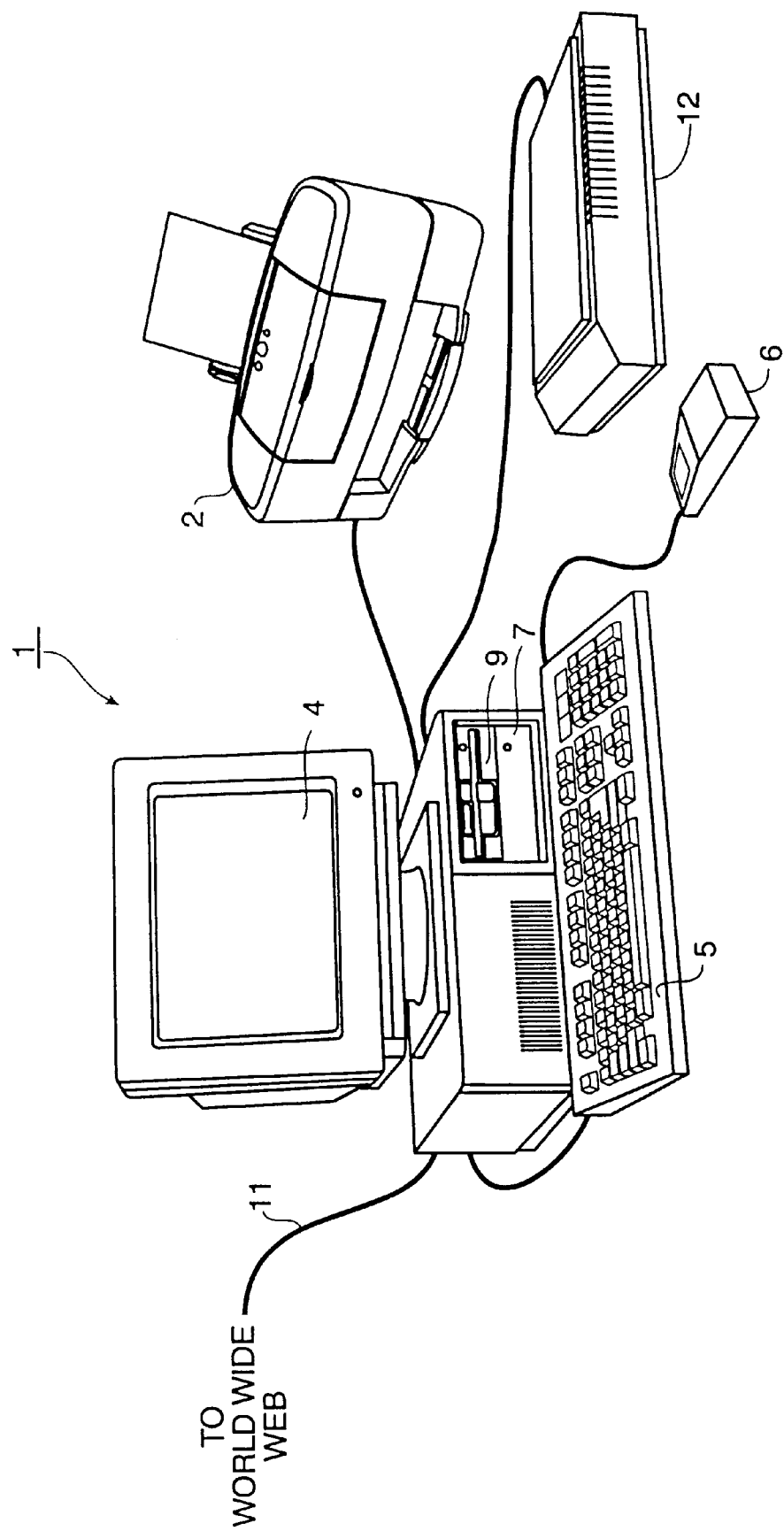
FIG. 1 is a view showing an outward appearance of a computing system embodying the present invention.

FIG. 1 is an outward view showing representative computing equipment embodying the present invention. Personal computer 1 is preferably an IBM PC-compatible computer having a windowing environment, such as Microsoft Windows 95. Provided with computer 1 is ink jet printer 2 adapted to print color images using inks of subtractive color components, such as cyan, magenta, yellow, and black. Also provided with computer 1 are display screen 4 comprising a color monitor or the like, keyboard 5 for entering text data and user commands, and pointing device 6 for pointing to and for manipulating objects displayed on display screen 4.

Computer 1 includes a computer-readable memory medium such as fixed disk 7 for storing computer-readable data. Fixed disk 7 stores, among other files, application programs by which computer 1 generates files, manipulates and stores those files on fixed disk 7, presents data in those files to an operator via display screen 4, and prints data in those files via printer 2. Fixed disk 7 also stores an operating system which, as noted above, is preferably a windowing operating system.

Device drivers are also stored in disk 7. At least one of the stored device drivers comprises a printer driver which provides a software interface to firmware in printer 2, thereby facilitating data transfer between computer 1 and printer 2. Preferably, the printer driver also comprises computer-executable process steps embodying the present invention.

Floppy disk drive 9 provides a means whereby computer 1 can access a computer-readable floppy disk storing data files, application program files, computer-executable process steps embodying the present invention, or the like. A similar CD-ROM interface (not shown) may be provided with computer 1 through which computer 1 can access application program files and data files stored on a CD-ROM.

Also provided with computer 1 is World Wide Web connection 11, which may be a modem connection, an integrated services digital network (ISDN) connection, or the like, through which computer 1 can download data files, image files, application program files, and computer-executable process steps embodying the present invention from the World Wide Web.

Image files may be obtained via scanner 12, which is also connected to computer 1.

Figure 2:
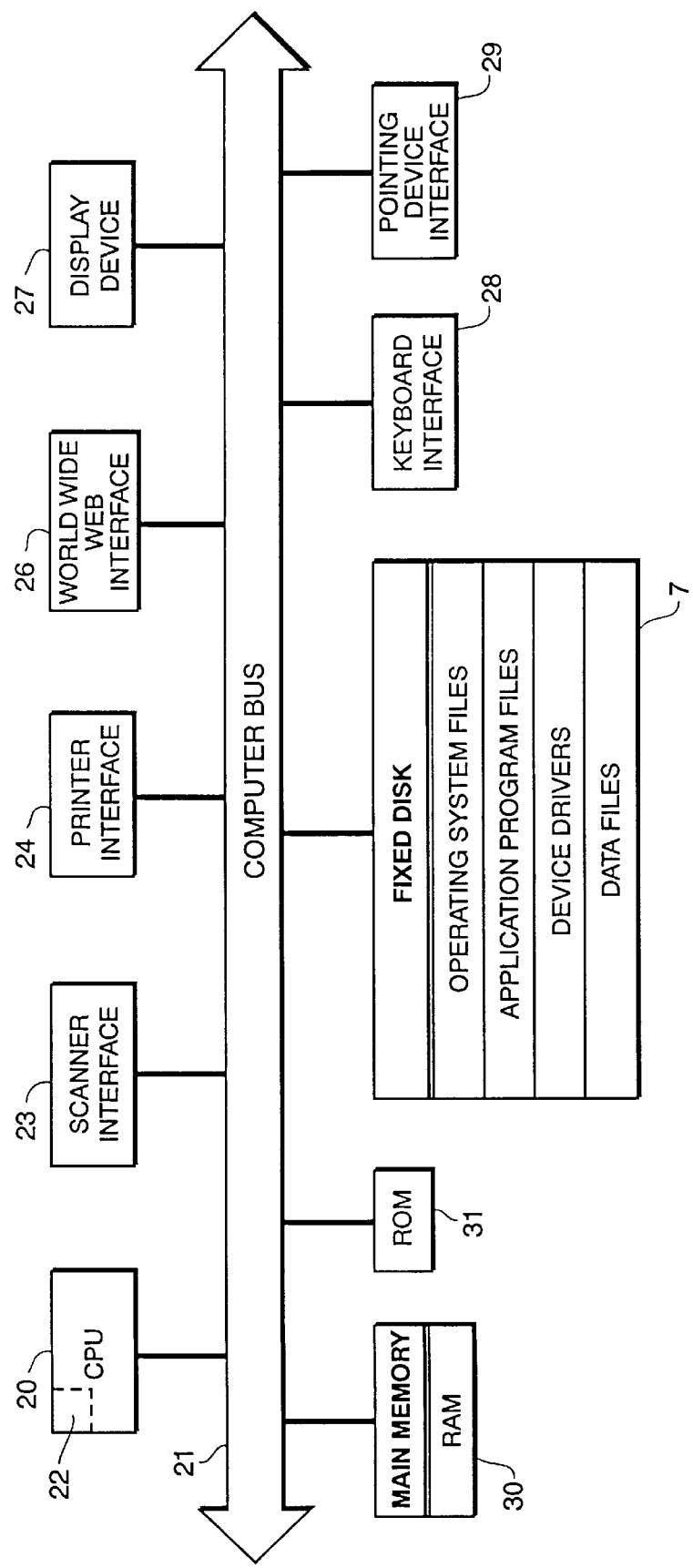
FIG. 2 is a block diagram of the functional architecture of the FIG. 2 computing system.

FIG. 2 is a block diagram showing the internal functional architecture of computer 1. As shown in FIG. 2, computer 1 includes CPU 20 for executing computer-executable process steps. In the preferred embodiment, CPU 20 is an Intel Pentium microprocessor having 32-bit registers as well as on-chip 8 kB L1 cache memory 22, represented by a dashed area within CPU 20. Advantageously, data loaded into cache memory 22 may be accessed by CPU 20 at a significantly greater speed than data stored in main memory 30. The preferred embodiment also exploits 32-bit processing provided by the Pentium™ microprocessor. However, it will be clear to those skilled in the art that the present invention may be used in conjunction with other microprocessors having various types and sizes of cache memory, and using any particular bit-length processing.

CPU 20 interfaces to computer bus 21. Also interfaced to computer bus 21 are scanner interface 22, printer interface 23, World Wide Web interface 26, display interface 27, keyboard interface 28, pointing device interface 29, and fixed disk 7.

As described above, fixed disk 7 includes a section for storing operating system program files, a section for storing application program files, a section for storing device drivers such as a printer driver to interface to printer 2, and a section for storing data files such as bitmap color image files for printing via printer 2.

A random access main memory ("RAM") 30 also interfaces to computer bus 21 to provide CPU 20 with access to memory storage. In particular, when executing stored computer-executable process steps from disk 7 (or other storage media such as media accessed via floppy disk drive 9 or World Wide Web connection 11), CPU 20 stores those process steps in RAM 30 and executes the stored process steps out of RAM 30. RAM 30 also provides a print buffer used by a printer driver embodying the present invention. It should be understood that standard disk-swapping techniques available under the windowing operating system allow segments of memory, including the above-mentioned print buffer, to be swapped on and off of fixed disk 7.

Read only memory ("ROM") 31 stores invariant instruction sequences such as start-up instruction sequences or basic input/output operating system (BIOS) sequences for operation of keyboard 5.

In the preferred embodiment, the present invention is used in conjunction with a system to print a color image representative of continuoustone (or multi-level) color image data displayed on screen 4 or otherwise stored in an image file. A method for performing such printing is described by the FIG. 3 flow diagram.

Figure 3:
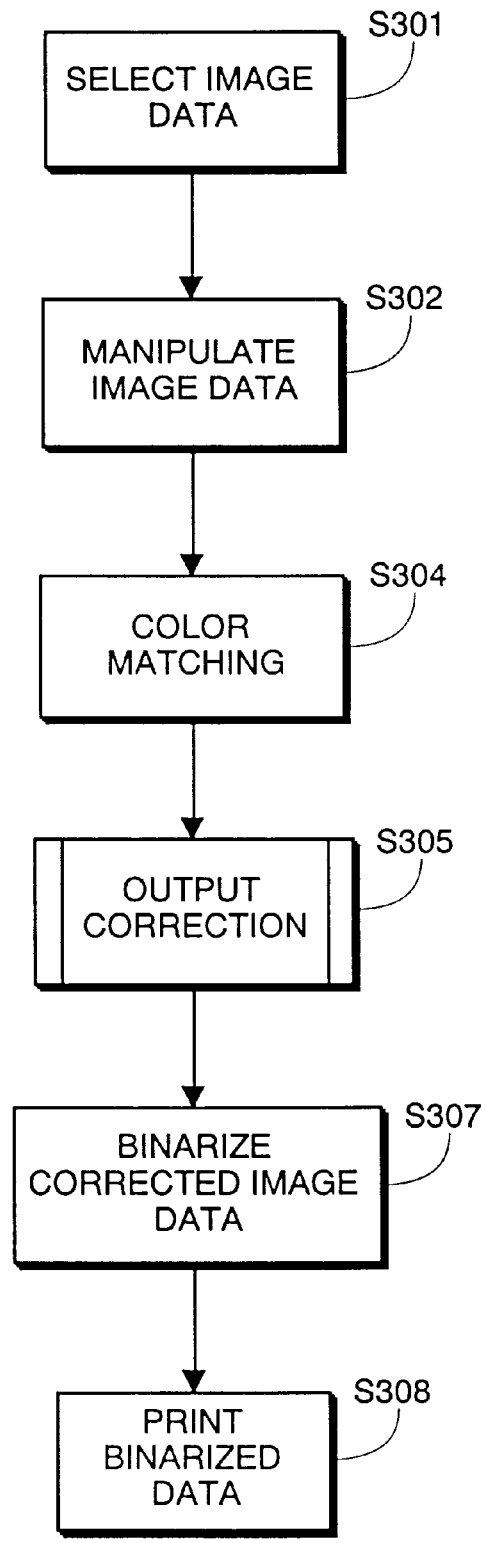
FIG. 3 is a flow diagram describing general process steps to print multi-level color image data.

In this regard, image data is selected for printing in step S301 of FIG. 3. Most commonly, during execution of an application program, a user uses pointing device 6 to manipulate a graphical user interface displayed by the application program on display screen 4 so as to select a color image file stored on fixed disk 7. As described above, the stored image files may be obtained from the World Wide Web, from a floppy disk inserted in floppy disk drive 7, or from scanner 12.

It should be noted that color image files are ordinarily stored in raster bitmap format, having stored for each pixel a corresponding color value for each of plural additive primary colors, such as red, green and blue.

Figure 4:
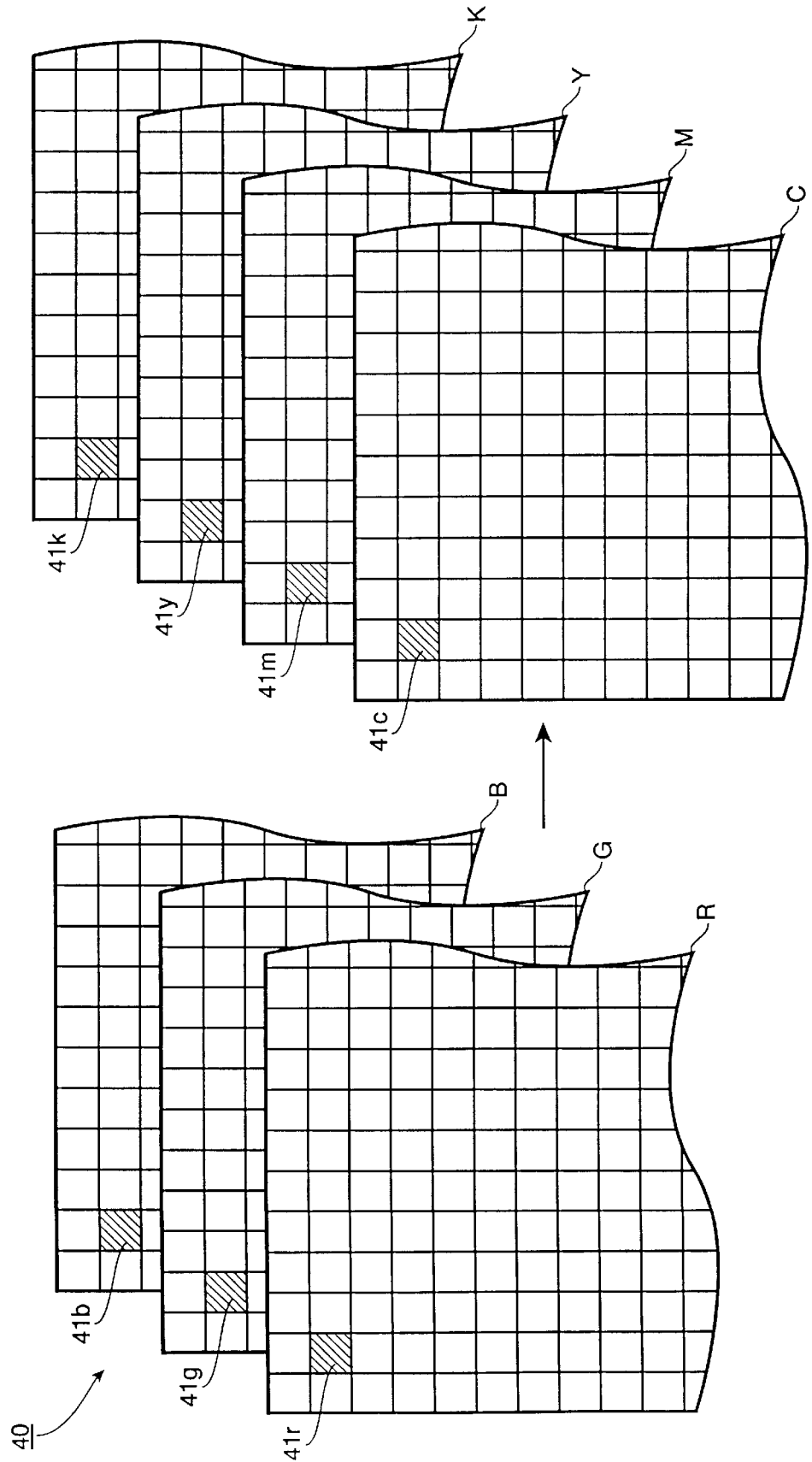
FIG. 4 illustrates planes of additive and subtractive color components used to represent color pixels.

FIG. 4 is a representational view of such a bitmap image 40. Bitmap image 40 is comprised of multi-level image data for three color planes, a red color plane R, a green color plane G, and a blue color plane B. Each pixel of image 40 has, in each color plane, a corresponding color value such as values 41r, 41g and 41b. For each of the R, G, and B color planes, color values are arranged in a two-dimensional raster array of pixels so as to form a rasterized bitmap image. In the example of FIG. 4, each of color values 41r, 41g and 41b is stored using an 8-bit byte. Thus, the color of each pixel in image 40 is represented by 24 bits of pixel data, and is commonly referred to as 24-bit or 16 million color data.

Next, in step S302, the selected image data is manipulated. For example, in a case that the application program is an image processing application program, the selected data may be subjected to several image processing operations, such as rotate, crop, size, color adjust, filtering, or the like. It should be noted that data manipulation according to step S302 may alter all or some planes of color values within the selected image data.

Flow then proceeds to step S304 to perform color matching. As described above, color printers print color pixels by selectively printing combinations of cyan, magenta, yellow and black ink at a desired pixel location. Accordingly, the red, green and blue planes of image data manipulated in step S302 must be color-matched into corresponding cyan, magenta, yellow and black planes.

FIG. 4 depicts a typical color matching situation, in which there are four printer colorants and thus four color planes: a cyan color plane C, a magenta color plane M, a yellow color plane Y, and a black color plane K. After color matching, and for each of the C, M, Y, and K color planes, color values are arranged in a two-dimensional raster array of pixels so as to form a rasterized bitmap. It should be noted that each pixel color value, such as 41c, 41m, 41y and 41k, is stored as an 8-bit byte, thereby representing one of 256 color values.

The color values of each color plane are subjected to output correction in step S305. Output correction according to the present invention will be described in more detail below with respect to FIG. 5. Briefly, output correction is used in order to compensate for various printing characteristics, such as printing mode (forward or reverse), print head characteristics (output level/input level), and the like. Accordingly, each color value in each color plane is input to output correction processing and a corresponding corrected value is thereby produced. It should be noted that, in the preferred embodiment, the resulting corrected values are 8-bit multi-level color values.

Color printers of the type in question, however, do not now have the ability to print multi-level color values. Rather, these color printers are binary printers since they can only deposit, or not deposit, a color ink dot at each pixel location.

Accordingly, to print a color image representative of multi-level color image data, it is necessary first to binarize the multi-level color values of each pixel so that each pixel in the print image is represented by one bit per pixel for each colorant. Such binarization is performed in step S307 of FIG. 3 and may consist of known techniques including dither techniques or error diffusion techniques. The results of binarization are stored in raster bitmap image form identical to that shown for planes 41c, 41m, 41y and 41k, however, with one bit representing each pixel in each color plane.

Next, in step S308, the binarized data of each color plane are printed.

Figure 5:
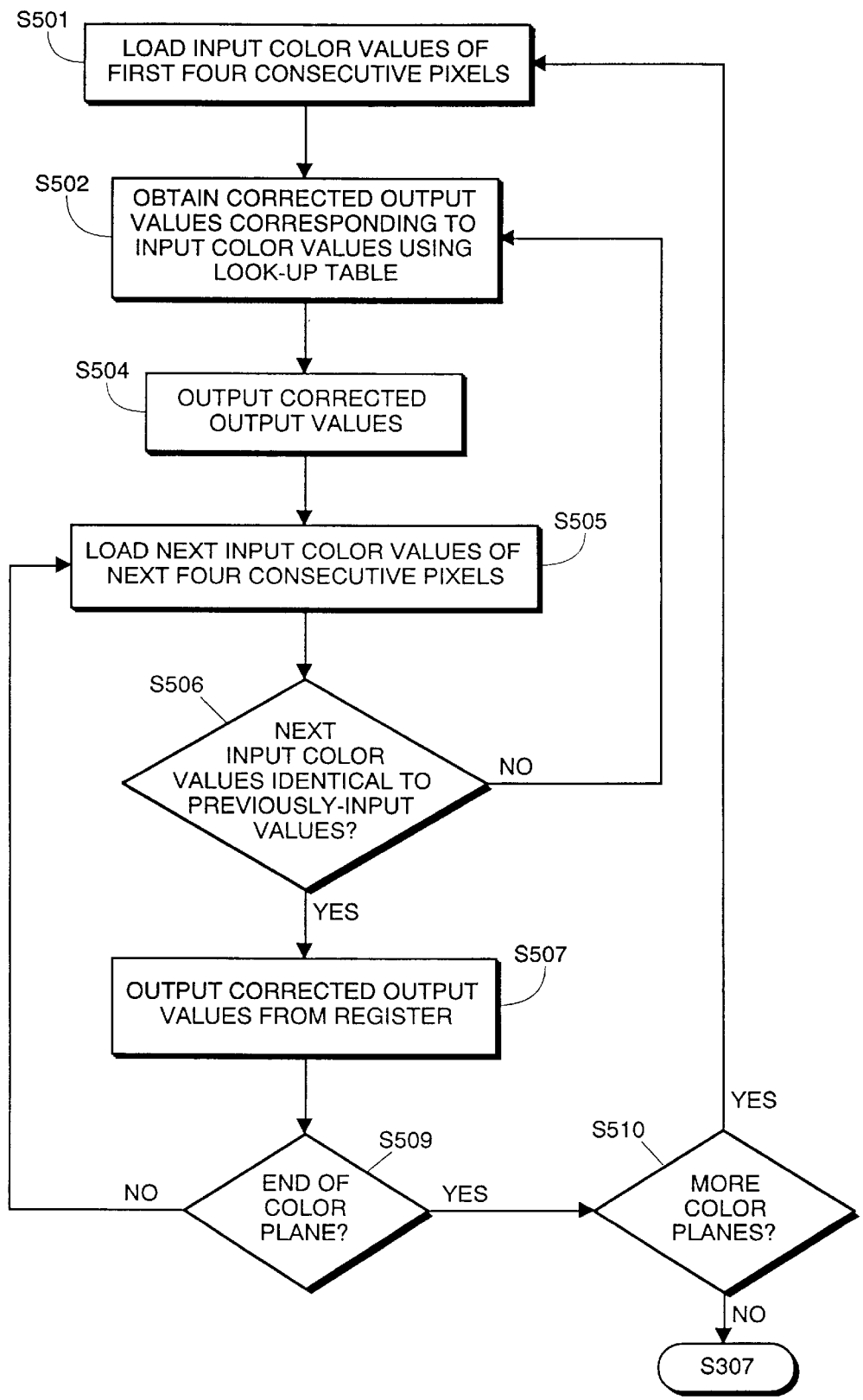
FIG. 5 is a flow diagram for describing process steps to correct color image data according to the present invention.

FIG. 5 is a detailed flow diagram for describing process steps to perform output correction according to the present invention. The process steps of FIG. 5 are preferably computer-executable process steps of a printer driver stored in fixed disk 7, which are loaded into RAM 30 and executed by CPU 20 out of RAM 30.

Briefly, the steps of FIG. 5 utilize a look-up table to correct pixel values, with each pixel represented by a byte of color data. First, look-up table correction is applied to first, second, third, and fourth bytes of input color value data to obtain corresponding first, second, third, and fourth bytes of corrected output data. Next, the first, second, third, and fourth bytes of input color value data are simultaneously compared to fifth, sixth, seventh, and eighth bytes of input color value data, respectively. If all comparisons in the comparison step indicate equality, the first, second, third, and fourth bytes of corrected output data are stored as outputs corresponding to the fifth, sixth, seventh, and eighth bytes of input color value data, and ninth, tenth, eleventh, and twelfth bytes of input color value data are compared to the first, second, third, and fourth bytes of input color value data. On the other hand, if any of the comparisons in the comparing step indicate inequality, look-up table correction is applied to obtain corrected output data corresponding to the fifth, sixth, seventh, and eighth bytes of input color value data.

More specifically, in step S501, 8-bit color values of a first four consecutive pixels in a first raster of a subject color plane are loaded from RAM 30 (or from disk 7) into cache memory 22 and then into a register of CPU 20. The four loaded color values are preferably dword aligned in cache memory 22 so as to transfer to a single 32-bit register from cache memory 22 in a minimum time. In this regard, 32-bit values having a memory address which is a multiple of four bytes are dword aligned and can thereby be quickly loaded into a single 32-bit register of CPU 20. Dword alignment also provides further processing benefits, which are described below with respect to step S506.

Flow then proceeds to step S502, in which a look-up table is used to obtain corrected output values corresponding to the input color values loaded in step S501. It should be noted that systems other than a look-up table may be used in conjunction with the present invention to obtain corrected output values, such as a mathematical formula or the like. In the preferred embodiment, the look-up table is provided by a printer driver embodying the present invention, and provides an output value corresponding to each of 256 possible input color values. Also in the preferred embodiment, a loaded input color value is used as an index to a look-up table, and a corrected output value corresponding to the index is obtained therefrom. This procedure results in the look-up table being loaded into cache memory 22. Moreover, the obtained output values are loaded into a 32-bit register of CPU 20. Advantageously, table look-up proceeds quickly because the input color values are loaded into a register and the look-up table is located in cache memory 22.

Therefore, after step S502, cache memory 22 contains the look-up table for the subject color plane, and the four corrected output values, as well as the four input color values, are located within respective 32-bit registers of CPU 20.

Next, in step S504, the four corrected output values are stored in an output-corrected multi-level image file in RAM 30. In step S505, next input color values of a next four consecutive pixels in the first raster of the subject color plane are loaded, in dword-aligned format, into cache memory 22 and thereafter into a third 32-bit register of CPU 20. In step S506, the next input color values loaded into a CPU register in step S505 are compared to the input color values loaded into a CPU register in step S501. Preferably, since the values loaded in step S501 and the values loaded in step S505 are identically formatted and loaded in CPU registers, step S506 can be quickly and easily performed using a single "compare" processor function.

If the determination in step S506 is negative, flow returns to step S502, wherein corrected output values corresponding to the color values loaded in step S505 are obtained using the look-up table now residing in cache memory 22. Flow then proceeds as described above.

In a case that the determination in step S506 is affirmative, flow proceeds to step S507, wherein the corrected output values obtained in step S502 are stored in the output-corrected multi-level image file. Flow then proceeds to step S509, wherein it is determined whether or not the last color value in the last raster of the subject color plane has been loaded. If so, flow proceeds to step S510, in which it is determined whether any more color planes must be subjected to output correction. If not, flow proceeds to step S307 of FIG. 3. If so, flow returns to step S501 as described above.

If the determination in step S509 is negative, flow returns to step S505, wherein next input color values of a next four consecutive pixels are loaded from a memory into cache memory 22, and then into a register of CPU 20. It should be noted that the values are loaded in step S505 in column/raster order, so that a last color value in a first raster is considered as consecutive to a first color value in a second raster.

It also should be noted that input color values loaded into a register during output correction of a color plane may overwrite previously-loaded input color values of the color plane. However, in order to provide fast comparison in step S506, input color values of an immediately previously-loaded four consecutive pixels should not be overwritten by input color values of a next four consecutive pixels. By virtue of this caveat, the values compared in step S506 are both available to CPU 20 within respective CPU registers.

Similarly, a CPU register containing corrected output values obtained in step S502 should not be overwritten until after a negative determination in step S506, so as to provide CPU 20 with fast access to the corrected output values for storage in step S507. Moreover, although the preferred embodiment contemplates having the input color values and corrected output values in CPU registers and look-up table in cache memory 22, these values may also be stored in other memory locations in practicing the invention.

Figure 6:
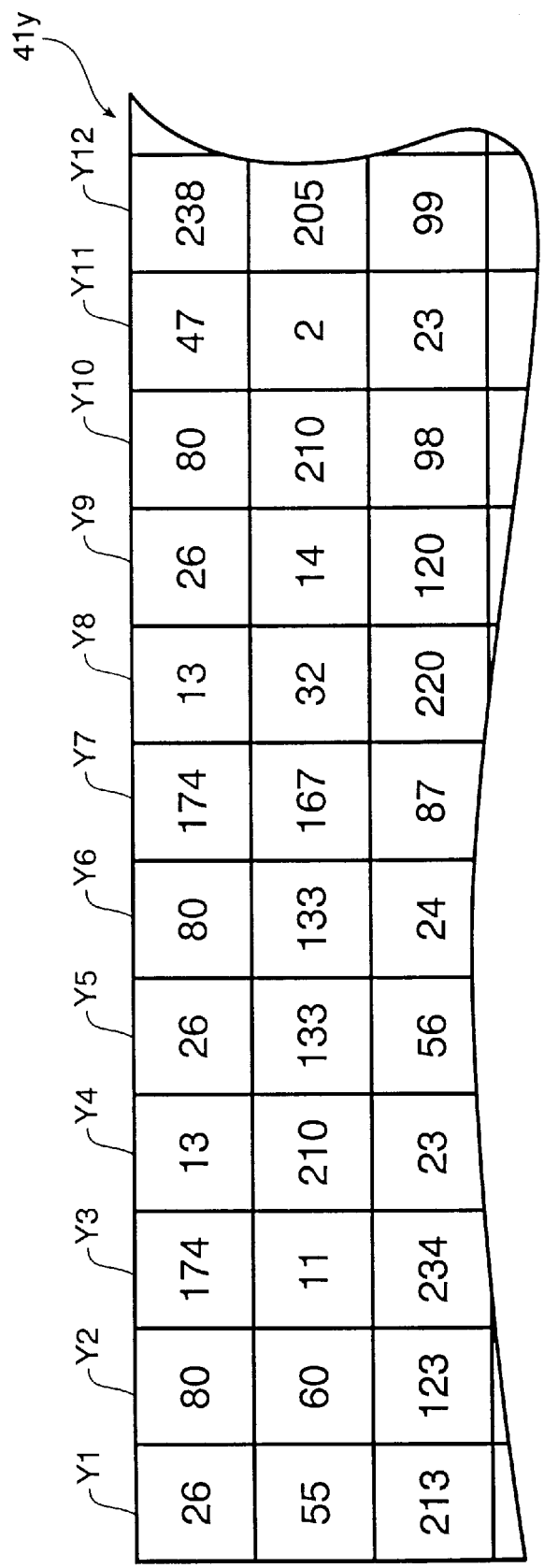
FIG. 6 shows a region of color values in a yellow color plane processed according to the present invention.

The FIG. 5 process steps will be described below with respect to the specific color values shown in plane 41y of FIG. 6. Initially, in step S501, color values Y1(26), Y2(80), Y3(174), and Y4(13) are loaded into cache memory 22 in dword-aligned format and then into a 32-bit register of CPU 20. Next, in step S502, each loaded value is used as index to a yellow colorant look-up table to obtain a corresponding corrected output value from the look-up table. In the present example, the corrected output values corresponding to input color values Y1, Y2, Y3 and Y4 are 27, 81, 175, and 14, respectively. Next, the corrected output values 27, 81, 175, and 14 are stored in an output-corrected multi-level image file in RAM 30.

In step S505, input color values Y5(26), Y6(80), Y7(174), and Y8(13) are loaded in dword-aligned format into cache memory 22 and then into a second 32-bit register of CPU 20. Register-loaded values Y5 to Y8 are then compared, in step S506, with register-loaded color values Y1 to Y4. Since value Y5 is identical to Y1, value Y6 is identical to Y2, value Y7 is identical to Y3, and value Y8 is identical to value Y4, flow proceeds to step S507, wherein the corrected output values obtained in step S502, particularly, 27, 81, 175, and 14 are stored in the output-corrected multi-level image file.

Advantageously, because values Y5 to Y8 were determined in step S506 to be identical to values Y1 to Y4, the present invention does not obtain corrected output values based on input color values Y5 to Y8. Rather, the present invention simply re-uses the corrected output values corresponding to input color values Y1 to Y4.

Next, in step S509, it is determined whether the last pixel of the last raster of color plane 41y has been loaded into cache memory 22. Accordingly, flow proceeds to step S505, wherein input color values Y9(26), Y10(80), Y11(47), and Y12(238) are loaded in dword-aligned format into cache memory 22 and then into a register of CPU 20. These loaded values may overwrite a register containing previously-loaded input color values Y1 to Y4, however, in accordance with the preferred embodiment, input color values Y9 to Y12 should not overwrite a register containing input color values Y5 to Y8.

Flow then proceeds to step S506, wherein input color values Y9 to Y12 are compared with input color values Y5 to Y8. Since input color value Y11 is not identical to input value Y7 and input color value Y12 is not identical to input color value Y8, flow returns to step S502, wherein corrected output values are obtained corresponding to input color values Y9 to Y12 using the yellow colorant look-up table. These corrected output values are then stored in the output-corrected multi-level image file in step S504. Flow continues from step S504 as described above.

It should be noted that the present invention may be used in any system for determining output values corresponding to a series of input values. of course, due to the repetitive nature of image data, the present invention provides particularly significant advantages when applied to image data.

While the present invention is described above with respect to what is currently considered its preferred embodiments, it is to be understood that the invention is not limited to that described above. To the contrary, the invention is intended to cover various modifications and equivalent arrangements included within the spirit and scope of the appended claims.

What is claimed is:

1. A method for correcting pixel color values, with each color value represented by a byte of data, comprising:

applying look-up table correction to first, second, third, and fourth bytes of input color value data to obtain corresponding first, second, third, and fourth bytes of corrected output data;

simultaneously comparing the first byte of input color value data to a fifth byte of input color value data, the second byte of input color value data to a sixth byte of input color value data, the third byte of input color value data to a seventh byte of input color value data, and the fourth byte of input color value data to an eighth byte of input color value data;

storing the first, second, third, and fourth bytes of corrected output data as outputs corresponding to the fifth, sixth, seventh, and eighth bytes of input color value data if all comparisons in said comparing step indicate equality; and applying look-up table correction to obtain corrected output data corresponding to the fifth, sixth, seventh, and eighth bytes of input color value data if any of the comparisons in said comparing step indicate inequality.

2. A computer-readable medium storing computer-executable process steps to apply a look-up table to correct pixel color values, with each color value represented by a byte of data, the process steps comprising:

an applying step to apply look-up table correction to first, second, third, and fourth bytes of input color value data to obtain corresponding first, second, third, and fourth bytes of corrected output data;

a comparing step to simultaneously compare the first byte of input color value data to a fifth byte of input color value data, the second byte of input color value data to a sixth byte of input color value data, the third byte of input color value data to a seventh byte of input color value data, and the fourth byte of input color value data to an eighth byte of input color value data;

a storing step to store the first, second, third, and fourth bytes of corrected output data as outputs corresponding to the fifth, sixth, seventh, and eighth bytes of input color value data if all comparisons in said comparing step indicate equality; and an applying step to apply look-up table correction to obtain corrected output data corresponding to the fifth, sixth, seventh, and eighth bytes of input color value data if any of the comparisons in said comparing step indicate inequality.

3. Computer-executable process steps stored on a computer-readable medium, the process steps to apply a look-up table to correct pixel color values, with each color value represented by a byte of data, the process steps comprising:

an applying step to apply look-up table correction to first, second, third, and fourth bytes of input color value data to obtain corresponding first, second, third, and fourth bytes of corrected output data;

a comparing step to simultaneously compare the first byte of input color value data to a fifth byte of input color value data, the second byte of input color value data to a sixth byte of input color value data, the third byte of input color value data to a seventh byte of input color value data, and the fourth byte of input color value data to an eighth byte of input color value data;

a storing step to store the first, second, third, and fourth bytes of corrected output data as outputs corresponding to the fifth, sixth, seventh, and eighth bytes of input color value data if all comparisons in said comparing step indicate equality; and an applying step to apply look-up table correction to obtain corrected output data corresponding to the fifth, sixth, seventh, and eighth bytes of input color value data if any of the comparisons in said comparing step indicate inequality.

4. A method for applying a look-up table to correct pixel color values, with each color value represented by a byte of data, comprising:

applying look-up table correction to first, second, third, and fourth bytes of input color value data to obtain corresponding first, second, third, and fourth bytes of corrected output data;

comparing the first byte of input color value data to a fifth byte of input color value data, the second byte of input color value data to a sixth byte of input color value data, the third byte of input color value data to a seventh byte of input color value data, and the fourth byte of input color value data to an eighth byte of input color value data;

storing the first, second, third, and fourth bytes of corrected output data as outputs corresponding to the fifth, sixth, seventh, and eighth bytes of input color value data if all comparisons in said comparing step indicate equality; and applying look-up table correction to the fifth, sixth, seventh, and eighth bytes of input color value data if any of the comparisons in said comparing step indicate inequality.

5. A method according to claim 4, wherein the comparisons in said comparing step are performed simultaneously using a dword compare function.

6. A method according to claim 4, wherein a process of comparing four bytes of new input color value data to four bytes of previously-input color value data and copying the corrected output data corresponding to the previously-input color value data as corrected output data for the new input color value data is repeated until the four bytes of new input color value data are not equal to the four bytes of previously-input color value data.

7. A computer-readable medium storing computer-executable process steps to apply a look-up table to correct pixel color values, with each color value represented by a byte of data, the process steps comprising:

an applying step to apply look-up table correction to first, second, third, and fourth bytes of input color value data to obtain corresponding first, second, third, and fourth bytes of corrected output data;

a comparing step to compare the first byte of input color value data to a fifth byte of input color value data, the second byte of input color value data to a sixth byte of input color value data, the third byte of input color value data to a seventh byte of input color value data, and the fourth byte of input color value data to an eighth byte of input color value data;

a storing step to store the first, second, third, and fourth bytes of corrected output data as outputs corresponding to the fifth, sixth, seventh, and eighth bytes of input color value data if all comparisons in said comparing step indicate equality; and an applying step to apply look-up table correction to the fifth, sixth, seventh, and eighth bytes of input color value data if any of the comparisons in said comparing step indicate inequality.

8. A computer-readable medium according to claim 7, wherein the comparisons in said comparing step are performed simultaneously using a dword compare function.

9. A computer-readable medium according to claim 7, the process steps further comprising a comparing step to compare four bytes of new input color value data to four bytes of previously-input color value data and a comparing step to copy corrected output data corresponding to the previously-input color value data as corrected output data for the new input color value data until the four bytes of new input color value data are not equal to the four bytes of previously-input color value data.

10. Computer-executable process steps stored on a computer-readable medium, the process steps to apply a look-up table to correct pixel color values, with each color value represented by a byte of data, the process steps comprising:

an applying step to apply look-up table correction to first, second, third, and fourth bytes of input color value data to obtain corresponding first, second, third, and fourth bytes of corrected output data;

a comparing step to compare the first byte of input color value data to a fifth byte of input color value data, the second byte of input color value data to a sixth byte of input color value data, the third byte of input color value data to a seventh byte of input color value data, and the fourth byte of input color value data to an eighth byte of input color value data;

an storing step to store the first, second, third, and fourth bytes of corrected output data as outputs corresponding to the fifth, sixth, seventh, and eighth bytes of input color value data if all comparisons in said comparing step indicate equality; and an applying step to apply look-up table correction to the fifth, sixth, seventh, and eighth bytes of input color value data if any of the comparisons in said comparing step indicate inequality.

11. Computer-executable process steps according to claim 10, wherein the comparisons in said comparing step are performed simultaneously using a dword compare function.

12. Computer-executable process steps according to claim 10, further comprising process steps to compare four bytes of new input color value data to four bytes of previously-input color value data and to copy corrected output data corresponding to the previously-input color value data as corrected output data for the new input color value data until the four bytes of new input color value data are not equal to the four bytes of previously-input color value data.

13. A method for correcting N-bit pixel values with a processor using X-bit processing, the method comprising:

applying look-up table correction to X/N pixel values to obtain X/N corrected output values;

determining whether a next X/N pixel values are identical to the X/N pixel values; and storing the X/N corrected output values as output values corresponding to the next X/N pixel values.

14. A method according to claim 13, further comprising applying look-up table correction to the next X/N pixel values to obtain next corresponding X/N corrected output values if it is determined that the X/N pixel values are not identical to the next X/N pixel values.

15. Computer-executable process steps stored on a computer-readable medium to correct N-bit pixel values with a processor using X-bit processing, the proces steps comprising:

an applying step to apply look-up table correction to X/N pixel values to obtain X/N corrected output values;

a determining step to determine whether a next X/N pixel values are identical to the X/N corrected output values as output values corresponding to the next X/N pixel values.

16. Computer-executable process steps according to claim 15, further comprising a step to apply look-up table correction to the next X/N corrected output values if it is determined that the X/N pixel values are not identical to the next X/N pixel values.

17. A computer-readable medium storing computer-executable process steps to correct N-bit pixel values with a processor using X-bit processing, the process steps comprising:

an applying step to apply look-up table correction to X/N pixel values to obtain X/N corrected output values;

a determining step to determine whether a next X/N pixel values are identical to the X/N picel values; and a storing step to store the X/N corrected output values as output values corresponding to the next X/N pixel values.

18. A computer-readable medium according to claim 17, further comprising an applying step to apply look-up table correction to the next X/N pixel values to obtain next corresponding X/N corrected output values if it is determined that the X/N pixel values are not identical to the next X/N pixel values.

* * * * *

UNITED STATES PATENT AND TRADEMARK OFFICE
CERTIFICATE OF CORRECTION

PATENT NO. : 6,075,514
DATED : June 13, 2000
INVENTOR(S) : Dennis L. Ryan

Page 1 of 1

It is certified that error appears in the above-identified patent and that said Letters Patent is hereby corrected as shown below:

Title page,
REFERENCES CITED
U.S. PATENT DOCUMENTS, please insert -- 5,610,997 3/1997 Ohta et al. ......... 382/218 --.

Column 4,
Line 26, "continuoustone" should read -- continuous-tone --.

Column 8,
Line 11, "of" (second occurrence) should read -- Of --.

Column 10,
Line 49, "an" should read -- a --.

Column 11,
Line 24, "X/N corrected" should read -- X/N pixel values; and a storing step to store the X/N corrected --.

Column 12,
Line 3, "X/N corrected" should read -- X/N pixel values to obtain next corresponding X/N corrected --
Line 14, "picel" should read -- pixel --.

Signed and Sealed this

Twenty-third Day of October, 2001

Attest:

NICHOLAS P. GODICI
Attesting Officer
Acting Director of the United States Patent and Trademark Office